(12) United States Patent
Ernst et al.

(10) Patent No.: US 8,358,440 B2
(45) Date of Patent: Jan. 22, 2013

(54) COLOR PRINTER CALIBRATION FOR MULTIPLE MEDIUMS

(75) Inventors: Larry M. Ernst, Longmont, CO (US); Charles D. Johnson, Boulder, CO (US); Hong Li, Superior, CO (US); Michael McDermott, Longmont, CO (US); Yue Qiao, Longmont, CO (US); Nenad Rijavec, Longmont, CO (US); Kenneth S. Shouldice, Firestone, CO (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 600 days.

(21) Appl. No.: 12/560,832

(22) Filed: Sep. 16, 2009

(65) Prior Publication Data

US 2011/0063633 A1    Mar. 17, 2011

(51) Int. Cl.
*G06F 15/00* (2006.01)
(52) U.S. Cl. ........ 358/1.9; 358/3.06; 358/406; 358/504; 358/521; 395/106; 395/109
(58) Field of Classification Search .................. 358/1.9; 395/106, 109
See application file for complete search history.

(56) References Cited

U.S. PATENT DOCUMENTS

| | | | |
|---|---|---|---|
| 6,999,199 B2 | 2/2006 | Degani et al. | |
| 2002/0085235 A1* | 7/2002 | Degani et al. | 358/3.06 |
| 2007/0177231 A1* | 8/2007 | Wang et al. | 358/504 |

* cited by examiner

*Primary Examiner* — Marivelisse Santiago Cordero
*Assistant Examiner* — Moustapha Diaby
(74) *Attorney, Agent, or Firm* — Duft Bornsen & Fishman, LLP

(57) ABSTRACT

Methods and systems herein provide for calibrating for a plurality of different paper types. In one embodiment, a system for calibrating a printer includes a measurement module operable to detect colors printed on a first tangible medium by the printer and convert the detected colors to a detected color characterization. The system also includes a storage module operable to store a calibration file. The calibration file includes color characterizations of a plurality of different tangible mediums and each color characterization includes color measurements for one of the plurality of different tangible mediums obtained from the printer via the measurement module when the printer is calibrated. The system also includes a calibration module operable to compare the detected color characterization to at least two color characterizations of the calibration file and determine an adjustment to an output color scheme of the printer based on the comparison to calibrate the printer.

12 Claims, 5 Drawing Sheets

COLOR PRINTER CALIBRATION FOR MULTIPLE MEDIUMS

BACKGROUND

1. Field of the Invention

The invention relates to the field of production printing systems and, in particular, to calibrating printers that print to a plurality of different print mediums, such as different types of paper.

2. Statement of the Problem

Production printing systems associated with data processing enterprises generally include a localized print controller within the printing system. The print controller controls the overall operation of the printing system including, for example, host interfacing, interpretation or rendering, and lower level process control or interface features of print engines of the printing system. Host interaction may include appropriate adapters for coupling the printing system to one or more host systems that transmit print jobs to the printing system. The print jobs are generally encoded in the form of a page description language such as PostScript (PS), PCL, IPDS, etc.

In whatever form the print job may be encoded or formatted, the print controller within the printing system interprets the received information to generate sheetside bitmaps of the print job. The sheetside bitmaps represent the image to be printed on one side of a sheet of a print medium. Each sheetside bitmap generally comprises a 2-dimensional array of picture elements ("pixels", or PELs) that represent a corresponding formatted sheet of the print job. Each pixel may represent an encoded color value in accordance with the requirements of the particular print job encoding and the capabilities of the printing system on which the print job is to be printed.

The print controller stores or buffers the sheetside bitmaps in accordance with storage capabilities of the particular architecture of a particular print controller. The print controller then forwards the sheetside bitmaps to one or more print engines (sometimes also referred to as an "imaging engine" or as a "marking engine"). The print engines have internal queues for storing the sheetside bitmaps to be printed. A print engine pulls the sheetside bitmaps off of the queue and performs an imaging process to mark the print medium with the sheetside bitmaps provided by the print controller. The print engine may comprise a laser print engine, an ink jet print engine, or another type of imaging system that transfers each sheetside bitmap to corresponding pixels on paper. Generally, the print engine is configured with the printer.

Output quality for the printers generally depends on the print engine characteristics being known and fixed, so that the color conversions and transfer curves can be constructed in advance. This known state may be referred to as the reference state. In practice, print engines tend to become uncalibrated due to environmental conditions and operating conditions. This "printer drift" degrades the output quality of a printed product because the amount of deposited toner varies. And, printer drift is generally impossible to model or predict because it depends on too many factors, both external and internal (e.g., temperature, humidity, printer age, etc.).

Printer drift has usually been solved by periodically recalibrating the printer. Printer calibration involves printing a set of test patches where the output is known assuming that the printer is in the reference state. The printed patches are then measured and compared to the known values for the reference state of the printer to determine a model of the printer drift. This model is then used to adjust the transfer curves (e.g., color conversion models) used for printing such that subsequent output can be corrected to the same as or close that of the printer in the reference state. Most printer manufacturers offer various calibration techniques to customers. For example, the "InfoPrint Manager" contains a halftone calibration system that allows the user to print test patches, measure the patches using an optical densitometer, and then recalibrate the printer using a single measurement set. This system is generally based on a single paper type.

To fully support cutsheet printers, a calibration system generally accounts for each print job using a variety of different paper types with each paper type behaving quite differently from another. Certain paper types may also not be available or known to a printer manufacturer, so a calibration system should allow end users to support any new paper type which complicates printer calibration. One manner of supporting multiple paper types includes assuming that papers are not that different from one another and using a transfer curve that is similar to the paper being printed to. Another manner includes assuming that enough information about a particular paper variation can be recovered by analyzing an International Color Consortium (ICC) profile of each paper without providing explicit paper management. Unfortunately, however, the paper characteristics cannot be fully recovered from ICC Profiles. In yet another manner, a reference paper is printed and measured for continuous use in the calibration. To calibrate other papers, a calibration system records the relationship of each paper and the reference paper and that relationship is then used to generate the calibration for the other papers. However, this method is not entirely accurate because it does not evaluate the actual paper in use. Accordingly, there exists a need to calibrate a printer for a variety of paper types that assures the paper being printed has an accurate transfer curve.

SUMMARY

Embodiments described herein regard a calibration process that is accurate for a plurality of different print mediums (e.g., paper types). In one embodiment, a system for calibrating a printer includes a measurement module operable to detect colors printed on a first tangible medium by the printer and convert the detected colors to a detected color characterization. The system also includes a storage module operable to store a calibration file. The calibration file includes color characterizations of a plurality of different tangible mediums and each color characterization includes color measurements for one of the different tangible mediums obtained from the printer via the measurement module when the printer is calibrated. The system also includes a calibration module operable to compare the detected color characterization to at least two color characterizations of the calibration file and determine an adjustment to an output color scheme of the printer based on the comparison to calibrate the printer.

Each of the color characterizations of the different tangible mediums may include a reference curve. In this regard, the calibration module may determine the adjustment to the output color scheme of the printer using at least two of the reference curves and the detected color characterization. For example, the calibration module may process at least two reference curves generally according to the equation $d_2 = R_B^{-1}(R_A(M_A^{-1}(R_B(d_0))))$ to determine a toner density, wherein $d_0$ is a digital count of the toner in one color plane, $R_B$ is a reference curve for a first paper type, $R_A$ is a reference curve for a second paper type, and $M_A$ is a measurement curve for the second paper type.

The first tangible medium may have a color characterization that differs from each of the color characterizations of the calibration file. In this regard, the calibration module is further operable to generate a color characterization for the medium comprising the reference curve. The ICC profile for the medium can be added to the new color characterization. Alternatively, the tangible medium may have a color characterization that matches one of the color characterizations of the color file. Generally, each of the color characterizations of the color file may include, for one type of paper, an ICC color profile and color data measured by the measurement module.

In another embodiment, a method of calibrating a color printer includes generating a calibration file by establishing a calibrated state of the color printer, printing a plurality of color patches to a first sheet of paper and a second sheet of paper, wherein the first and second papers are different, and measuring the printed color patches printed on the first and second sheets of papers to determine color characterizations of the first and second sheets of paper in the calibrated state. The method also includes printing a plurality of color patches to a third sheet of paper, measuring the color patches of the third sheet of paper to generate a detected color characterization, and comparing the detected color characterization to the calibration file to determine an adjustment to an output color scheme of the printer based on the color characterizations of the first and second sheets of paper. The method also includes calibrating the printer to the third sheet of paper using the determined adjustment to the output color scheme of the printer.

In another embodiment, a software program for calibrating a CMYK color printer, the software program comprising instructions that are configured to direct a print controller associated with the printer to print a plurality of color patches to a sheet of paper and retrieve a calibration file. The calibration files includes reference curves for each CMYK color for at least two paper types and measurement curves for each CMYK color for the corresponding paper types. The measurement curves are obtained when the printer is calibrated. The instructions also direct the print controller to compare a color file that includes measurements of the color patches printed to the sheet of paper to the calibration file to determine an adjustment to an output color scheme of the printer based on the reference curves of the paper types and calibrate the printer to the sheet of paper using the determined adjustment to the output color scheme of the printer.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF THE EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
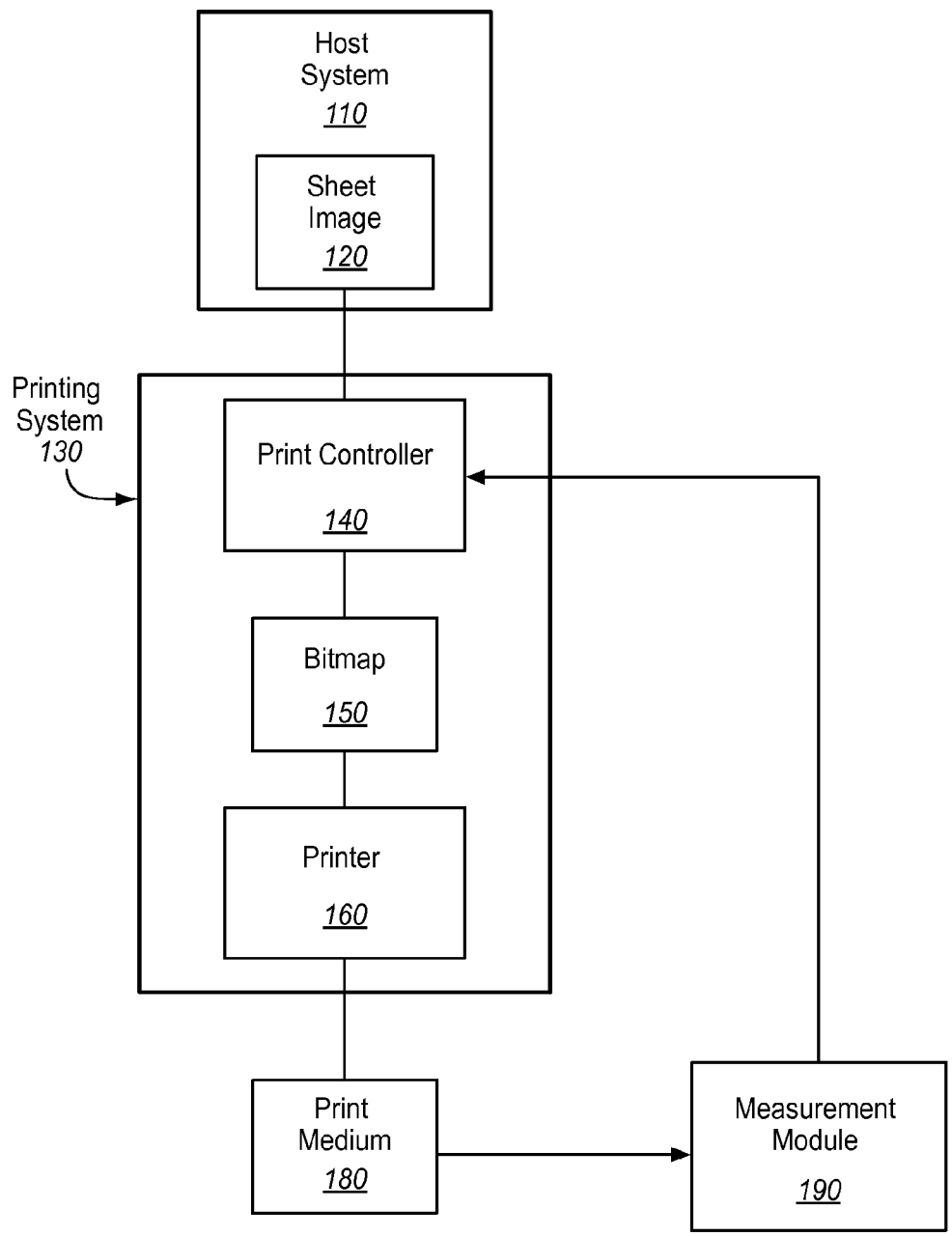
FIG. 1 is a block diagram illustrating a printing system in an exemplary embodiment.

FIG. 1 is a block diagram illustrating a printing system 130 in an exemplary embodiment. A host system 110 is in communication with the printing system 130 to print a sheet image 120 onto a print medium 180 (e.g., paper) via a printer 160. The resulting print medium 180 may be printed in color and/or in any of a number of gray shades, including black and white (e.g., Cyan, Magenta, Yellow, and blacK, or CMYK). The host system 110 may comprise any computing device, such as a personal computer, a server, or even a digital imaging device, such as a digital camera or a scanner. The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for printing to the print medium 180 via the printer 160. The printing system 130 may be a high-speed printer operable to print relatively high volumes (e.g., greater than 100 pages per minute). The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120.

Figure 2:
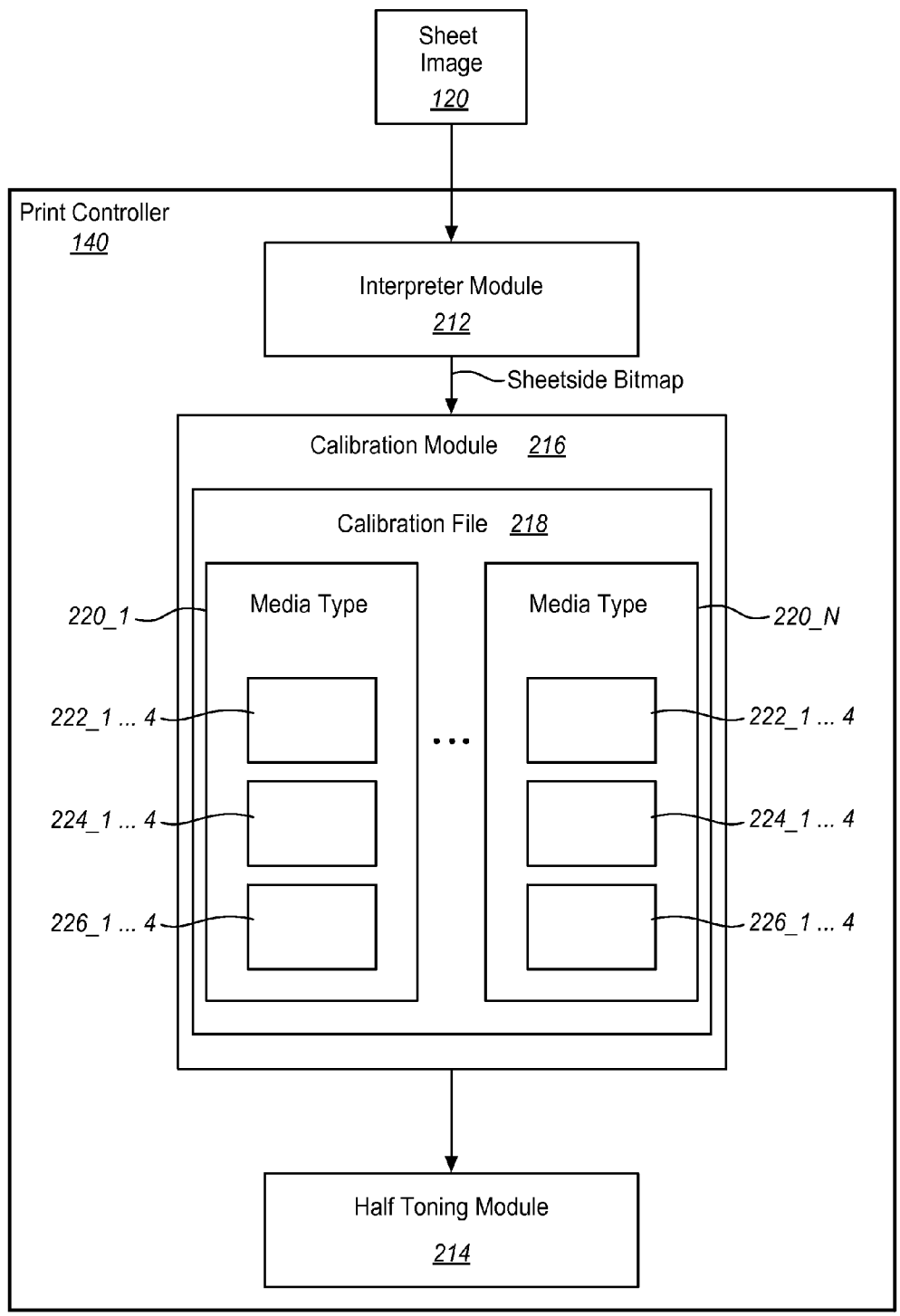
FIG. 2 is a block diagram illustrating a print controller in an exemplary embodiment.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities. FIG. 2 is a block diagram illustrating an exemplary print controller 140. The print controller 140, in its generalized form, includes an interpreter module 212, a halftoning module 214, and a calibration module 216. These separate components may represent hardware used to implement the print controller 140. Alternatively or additionally, the separate components may represent logical blocks implemented by executing software instructions in a processor of the printer controller 140. Accordingly, the invention is not intended to be limited to any particular implementation as such may be a matter of design choice.

The interpreter module 212 is operable to interpret, render, rasterize, or otherwise convert images (i.e., raw sheetside images such as sheet image 120) of a print job into sheetside bitmaps. The sheetside bitmaps generated by the interpreter module 212 are each a 2-dimensional array of pixels representing an image of the print job (i.e., a CTI), also referred to as full sheetside bitmaps. The 2-dimensional pixel arrays are considered "full" sheetside bitmaps because the bitmaps include the entire set of pixels for the image. The interpreter module 212 is operable to interpret or render multiple raw sheetsides concurrently so that the rate of rendering substantially matches the rate of imaging of production print engines.

The halftoning module 214 is operable to represent the sheetside bitmaps as halftone patterns of toner. For example, the halftoning module 214 may convert the pixels to halftone patterns of CMYK toner for application to the paper. Once computed, the halftoning module 214 transfers the converted sheetside bitmaps to the printer 160 to apply the toner to the paper. The print controller 140 may further include other modules such as a print job storage system, a raw data preprocessing system, and a bitmap processing system, etc.

The calibration module 216 comprises hardware, software, firmware, or any combination thereof, that is operable to calibrate the printer 160 for a particular print medium type based on previously determined color characterizations 220_1 ... N of other print medium types. To assist in the calibration, a measurement module 190 may be used to detect colors printed to various tangible mediums. For example, the measurement module 190 may be an optical densitometer or a spectrophotometer that detects colors on the print medium 180 and converts the detected colors to a detected color characterization for use in calibrating the printer 160.

Figure 3:
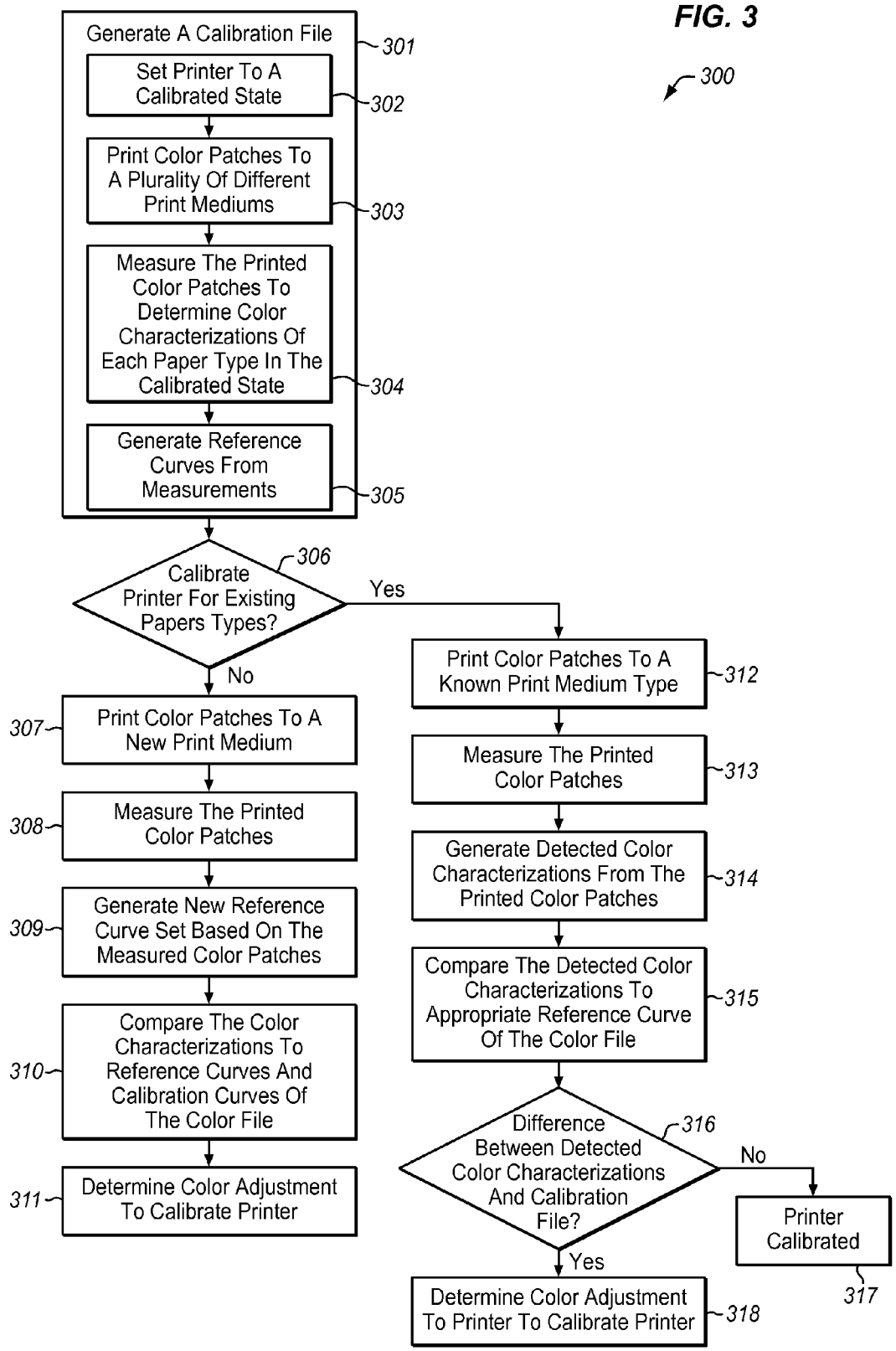
FIG. 3 is a flow chart illustrating a general method of printer calibration in an exemplary embodiment.

FIG. 3 is a flow chart illustrating one exemplary process for calibrating the printer 160. In this embodiment, the process begins essentially at the manufacture of the printing system 130 where the calibration module 218 is first configured with a calibration file 218 that is representative of several different types of media (e.g., paper). For example, the printing system 130 may have multiple paper types loaded at any given time. Printing to these loaded papers may be switched as desired. The calibration module 216 of the print controller 140 may enable the printer 160 to be calibrated once for each known paper type, generate the calibration file 216 from the calibration results in the process element 301, and apply those calibration results automatically to any new paper used in the printing system 130. To generate the calibration file 218, the calibration module 216 evaluates known types of media that the printer 160 is likely to print. The printer 160 is first set to a calibrated state where printing characteristics are initially known in the process element 302. This initial calibrated state of the printer 160 may be referred to as the reference state. Calibration is generally performed for each color plane in the CMYK color scheme for a particular print medium, such that a color characterization 220 includes 1-dimensional calibration curves for each color plane in the CMYK color scheme.

Generally, when any new paper is supported by the printing system 130, the calibration module 216 generates a new set of reference curves for that paper. To generate the reference curves for the new paper, the printer 160 prints a set of color patches onto a print medium in the process element 303. The measurement module 190 measures the printed color patches in the process element 304 such that the calibration module 216 may determine a color characterization 220 for the print medium. For example, the measurement module 190 may generate an electronic file containing a color characterization measured from the printed color patches and transfer it to the calibration module 216 via USB, portable storage media (e.g., flash USB drives, CD-ROM, etc), or any other suitable means for transferring electronic data. The calibration module 216 may then smooth and perform additional processing, such as linearization, to generate reference curves 222_1 ... 4 for the media type.

The reference curves 222 characterize the behavior of the printer 160 for a particular print medium 180 when the printer 160 is in the reference state. In this regard, the calibration module 216 may use the measurements to generate a 1-dimensional reference curve 222 for each color plane in the process element 305. Each print medium type is, therefore, represented as two sets of 1-dimensional curves, a reference curve set (reference curves 222_1 ... 4) and a measurement curve set (measurement curves 224_1 ... 4), with each set having one curve for each color plane in CMYK, for a total of four reference curves and four measurement curves. The reference curves 222_1 ... 4 describe the paper's behavior when the printer is in the reference state. The measurement curves 224_1 ... 4 describe each paper's behavior in the current printer state, relative to the reference state.

If the printer is in the reference state, the reference curves 222_1 ... 4 and the measurement curves 224_1 ... 4 are generally the same, referred to as reference curve identity. If the printer is not in the reference state, however, the measurements for a particular color plane (i.e., the measurement curves 224_1 ... 4) differ from the reference curves 222_1 ... 4. To produce the same output as would be obtained on the printer 160 in the reference state, the calibration module 216 corrects the differences between the measured curves 224_1 ... 4 and the reference curves 222_1 ... 4 to calibrate the printer 160.

In doing so, a determination is made as to whether a calibration is necessary in the process element 306. If a calibration is required for print mediums 180 with known medium type color characterizations 220, then the calibration module 216 directs the printer 160 to print color patches to one of the known print mediums in the process element 312. From there, the measurement module 190 measures the printed color patches in the process element 313 to generate a detected color characterization (e.g., the measurement curves 224) in the process element 314. The calibration module 216 may then compare the detected color characterization to the appropriate reference curves 222 of the calibration file 218. For example, the calibration module 216 may compare the measurement curves 224_1 ... 4 of a particular media type with the known reference curves 222_1 ... 4 for that media type in the process element 315 to determine a difference between the detected color characterization and the calibration file 218 (i.e., the reference curves 222_1 ... 4). If a difference between the detected color characterization and the reference curves 222_1 ... 4 exists, the calibration module 216 determines a color adjustment to the printer 160 in the process element 318. Otherwise, the printer is deemed calibrated in the process element 317.

In this regard, the configuration module 216 may also include calibration curves 226_1 ... 4 for each color of each media type known medium type color characterization 220. The calibration curves 226_1 ... 4 may implement the color adjustment to the printer 160. For example, the calibration curve 226_1 ... 4 may be a 1-D transfer curve that maps each input value to an output value. Thus, when the calibration module 216 determines the color adjustment to the printer 160, the calibration module 216 generates a calibration curve 226_1 ... 4 to calibrate the printer 160. If the printer 160 is calibrated, then the calibration curve 226_1 ... 4 is considered to be "identity".

To further illustrate, the calibration module 216 may process the reference curves 222_1 ... 4 (i.e., one for each color) for each print medium 180 along with the ICC Profile for each print medium. Once a measurement is made for a particular print medium 180 and the set of measurement curves 224_1 ... 4 for the print medium is generated (e.g., via the measurement module 190), the calibration module 216 may apply the measurement curves 224_1 ... 4 to a different paper. For example, assume papers A and B have respective reference curves $R_A$ and $R_B$. Let $M_A$ be the measurement curves 224_1 ... 4 obtained for paper A, and let $c_A$ and $c_B$ be the desired calibration curves. Then $$c_A = F(R_A, M_A) \text{ and}$$

$$c_B = G(R_B, R_A, M_A),$$

where the function F computes the calibration curve $c_A$ from the measurements made on the paper A by using known differences in the paper behavior encoded in $R_A$ and where the function G computes the calibration curve $c_B$ from the measurements made on the paper A using known differences in the paper behavior encoded in $R_A$ and $R_B$.

Figure 4:
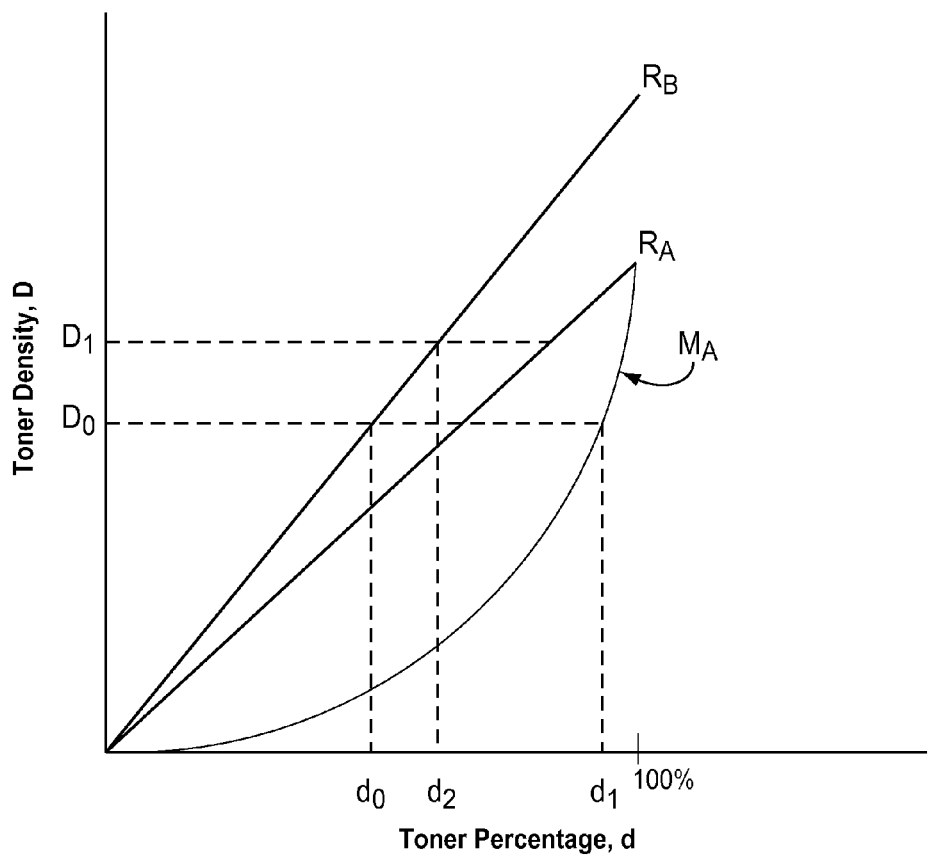
FIG. 4 is a graph illustrating mapping of a digital toner count in one color plane to calibrate a printer in an exemplary embodiment.

More specifically, the calibration module 216 may process at least two reference curves 222 according to the equation $d_2 = R_B^{-1}(R_A(M_A^{-1}(R_B(d_0))))$ to determine a toner density D, where $d_0$ is a digital count of the toner in one color plane, $R_B$ is a reference curve 222_1 for a first paper type 220_1, $R_A$ is a reference curve 222_1 for a second paper type 220_2, and $M_A$ is a measurement curve 224_1 for the second paper type 220_2. In doing so, the calibration module 216 may establish $D_0 = R_B(d_0)$, where $D_0$ is a desired toner density, $d_1 = M_A^{-1}(R_B(d_0))$, and $D_1 = R_A(M_A^{-1}(R_B(d_0)))$. The calibration module 216 then determines $d_1$ such that $D_0 = M_A(d_1)$. In doing so, the calibration module 216 determines $D_1 = R_A(d_1)$ and $d_2$ such that $D_1 = R_B(d_2)$. This process is performed for each color of CMYK. Then, the calibration module 216 maps $d_0$ to $d_2$. An example of such a mapping is illustrated in FIG. 4.

When a page is rasterized for printing on the paper A, the ICC profile for paper A is used and the bitmap may be corrected using the calibration curve $c_A$ (i.e., for each color). Similarly, the ICC Profile for paper B and the calibration curve $c_B$ may be used to calibrate the printer 160 for a page printed on paper B. If the calibration module 216 detects no difference between a detected color characterization and a color characterization of the calibration file 218, the printer 160 is deemed calibrated in the process element 317 and the printer 160 can continue printing without adjustment.

When a new print medium 180 is introduced to the system, a new color characterization is configured for that new medium. The calibration module 216, in this regard, determines a new set of reference curves 222 and measurement curves 224 for the new print medium 180. To do so, the calibration module 216 directs the printer 160 to print a set of color patches to the new print medium 180 in the process element 307. From there, the measurement module 190 measures the printed color patches in the process element 308 and generates the reference curve set 222_1 . . . 4 for the new print medium, as if the printer 160 was well-calibrated in the process element 309. The calibration module 216 then identifies the reference curves 222 and calibration curves 226 for the most recently calibrated media in the printing system 130 in the process element 310. The calibration module 216 uses these curves to correct the generated reference curve for the printer drift in the process element 311. Let $r_A$ and $c_A$ be the reference and calibration curves, respectively. For example, let $L_0$ be a value in the reference curve for the new medium. Let $d_0$ be such that $r_A(d_0) = L_0$. Let $d_1$ be such that $d_0 = c_A(d_0)$ and let $L_1 = r_A(d_1)$. Then the value $L_0$ in the new medium reference curve is replaced by $L_1$. This process generates the reference curves 222_1 . . . 4 for the new medium.

Figure 5:
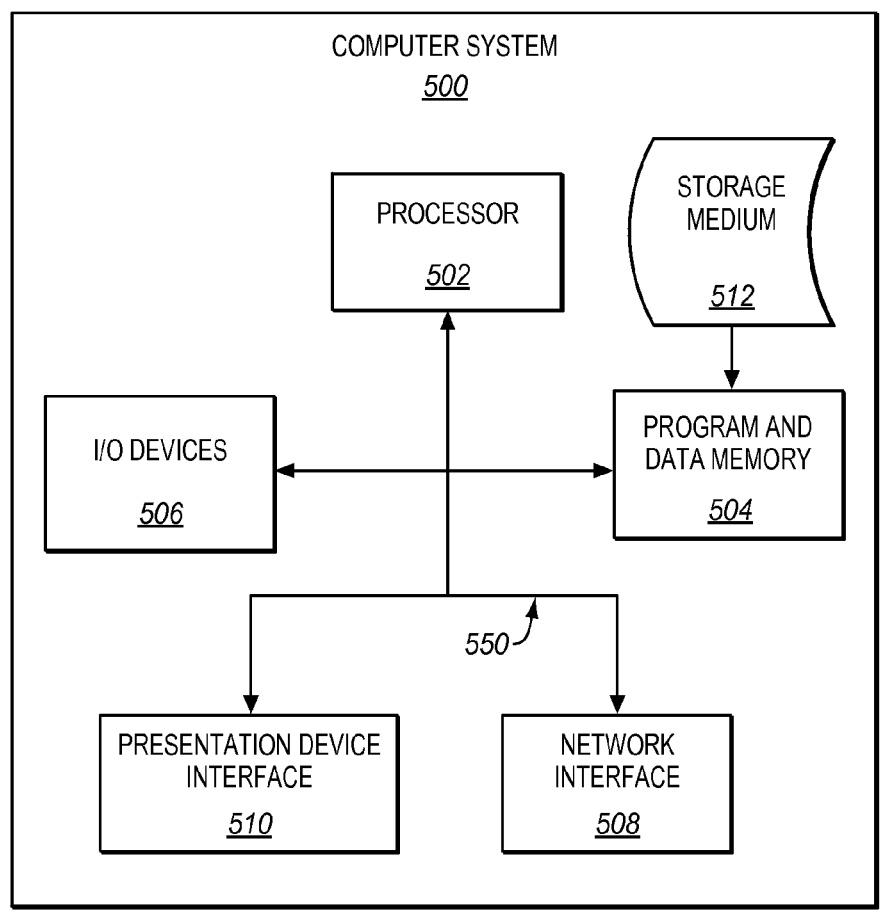
FIG. 5 illustrates a computer system operable to execute computer readable medium embodying programmed instructions to perform desired functions in an exemplary embodiment.

As mentioned, embodiments disclosed herein can take the form of software, hardware, firmware, or various combinations thereof. In one particular embodiment, software is used to direct the processor of the print controller 140 to perform the various operations disclosed herein. FIG. 5 is a block diagram depicting a computer system 500 operable to provide features and aspects hereof by executing programmed instructions and accessing data stored on a computer readable storage medium 512.

Furthermore, embodiments of the invention can take the form of a computer program product accessible from a computer-usable or computer-readable medium 512 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A computer system 500 suitable for storing and/or executing program code will include at least one processor 502 coupled directly or indirectly to memory elements 504 through a system bus 550. The memory elements 504 can include local memory employed during actual execution of the program code, bulk storage, and cache memories which provide temporary storage of at least some program code and/or data in order to reduce the number of times code and/or data must be retrieved from bulk storage during execution.

Input/output or I/O devices 506 (including but not limited to keyboards, displays, pointing devices, etc) can be coupled to the system either directly or through intervening I/O controllers. Network adapter interfaces 508 may also be coupled to the system to enable the computer system 500 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 510 may be coupled to the system to interface to one or more presentation device such as printing systems and displays for presentation of presentation data generated by processor 502.

In the context of printing, the invention is not intended to be limited to any particular type of printer. For example, the calibration described herein may be employed in either ink or toner based printers. Moreover, the calibration may be employed in printers ranging in size from small household printers to large commercial printers. In one embodiment, the calibration may be implemented as software instructions operable with a host system (or other computer systems) as opposed to being performed with the print controller to perform calibration. For example, software instructions may direct a processing system, such as a general purpose computer, to generate the HTI and transfer it to the print controller for printing via the printer. Thus, although claimed and described with respect to a print controller, such designations are merely intended to describe the general calibration that may have been traditionally performed by a print controller.

Although specific embodiments were described herein, the scope of the invention is not limited to those specific embodiments. The scope of the invention is defined by the following claims and any equivalents thereof.

We claim:

1. A system for calibrating a printer, the system comprising:

a measurement module operable to detect colors printed on a first tangible medium by the printer and to convert the detected colors to a detected color characterization;

a storage module operable to store a calibration file, wherein the calibration file comprises color characterizations of a plurality of different tangible mediums and wherein each color characterization comprises color measurements for one of the plurality of different tangible mediums obtained from the printer via the measurement module when the printer is calibrated; and a calibration module operable to compare the detected color characterization to at least two color characterizations of the calibration file and to determine an adjustment to an output color scheme of the printer based on the comparison to calibrate the printer, wherein each of the color characterizations of the plurality of different tangible mediums includes a reference curve and wherein the calibration module is further operable to determine the adjustment to the output color scheme of the printer using at least two of the reference curves and the detected color characterization, wherein the calibration module is further operable to process said at least two reference curves according to the equation $d_2=R_B^{-1}(R_A(M_A^{-1}(R_B(d_0))))$ to determine a toner density, wherein $d_2$ is a desired digital count of the toner, $d_0$ is a digital count of the toner in one color plane, $R_B$ is a reference curve for a first paper type, $R_A$ is a reference curve for a second paper type, and $M_A$ is a measurement curve for the second paper type.

2. The system of claim 1, wherein the first tangible medium has a color characterization that differs from each of the color characterizations of the calibration file, wherein the calibration module is further operable to identify a color characterization from the calibration file that most matches the detected color characterization to determine the adjustment to the output color scheme of the printer.

3. The system of claim 1, wherein the tangible medium has a color characterization that matches one of the color characterizations of the calibration file.

4. The system of claim 1, wherein each of the color characterizations of the color file includes, for one type of paper, an International Color Consortium color profile and color data measured by the measurement module.

5. A method of calibrating a color printer, the method comprising:

generating a calibration file, wherein generating the calibration fries file comprises:

establishing a calibrated state of the color printer, printing a plurality of color patches to a first sheet of paper and a second sheet of paper, wherein the first and second papers are different, measuring the printed color patches printed on the first and second sheets of papers to determine color characterizations of the first and second sheets of paper in the calibrated state, and printing a plurality of color patches to a third sheet of paper; measuring the color patches of the third sheet of paper to generate a detected color characterization;

comparing the detected color characterization to the calibration file to determine an adjustment to an output color scheme of the printer based on the color characterizations of the first and second sheets of paper; and calibrating the printer to the third sheet of paper using the determined adjustment to the output color scheme of the printer, wherein the each of the color characterizations of the first and second sheets of paper includes a reference curve, wherein the method further comprises determining the adjustment to the output color scheme of the printer using the reference curves of the first and second sheets of paper and the detected color characterization, wherein determining the adjustment to the output color scheme of the printer comprises processing the reference curves of the first and second sheets of paper generally according to the equation $d_2=R_B^{-1}(R_A(M_A^{-1}(R_B(d_0))))$ to determine a toner density, wherein $d_2$ is a desired digital count of the toner, $d_0$ is a digital count of the toner in one color plane, $R_B$ is a reference curve for the first sheet of paper, $R_A$ is a reference curve for the second sheet of paper, and $M_A$ is a measurement curve for the second sheet of paper.

6. The method of claim 5, wherein the third sheet of paper is different from the first and second sheets of paper.

7. The method of claim 5, wherein the third sheet of paper is the same type as the first sheet of paper, wherein the printer is uncalibrated.

8. The method of claim 5, wherein the third sheet of paper has a color characterization that differs from each of the color characterizations of the calibration file, wherein the method further comprises identifying a color characterization from the color file that most matches the detected color characterization to determine the adjustment to the output color scheme of the printer.

9. The method of claim 5, wherein the third sheet of paper has a color characterization that matches one of the color characterizations of the calibration file.

10. A software program stored on a non-transitory computer readable medium for calibrating a CMYK color printer, the software program comprising instructions that are configured to direct a print controller associated with the printer to:

print a plurality of color patches to a sheet of paper;

retrieve a calibration file, wherein the calibration file comprises reference curves for each CMYK color for at least two paper types and measurement curves for each CMYK color for the corresponding at least two paper types, wherein the measurement curves are obtained when the printer is calibrated;

compare a color file that includes measurements of the color patches printed to the sheet of paper to the calibration file to determine an adjustment to an output color scheme of the printer based on the reference curves of the at least two paper types;

calibrate the printer to the sheet of paper using the determined adjustment to the output color scheme of the printer, and direct the print controller to process the reference curves of the at least two paper types according to the equation $d_2=R_B^{-1}(R_A(M_A^{-1}(R_B(d_0))))$ to determine a toner density, wherein $d_2$ is a desired digital count of the toner, $d_0$ is a digital count of the toner in one color plane, $R_B$ is a reference curve for a first paper type of paper, $R_A$ is a reference curve for a second paper type, and $M_A$ is a measurement curve for the second paper type.

11. The software program of claim 10, wherein the sheet of paper has a type that is different from the at least two paper types.

12. The software program of claim 10, wherein the sheet of paper has a type that is the same as the at least two paper types, wherein the printer is uncalibrated.

* * * * *